US012531228B2

(12) United States Patent
Lee

(10) Patent No.: US 12,531,228 B2
(45) Date of Patent: Jan. 20, 2026

(54) ION CYCLOTRON RESONANCE SEPARATOR APPARATUS AND METHOD OF USE THEREOF

(71) Applicant: W. Davis Lee, Rockport, ME (US)

(72) Inventor: W. Davis Lee, Rockport, ME (US)

( * ) Notice: Subject to any disclaimer, the term of this patent is extended or adjusted under 35 U.S.C. 154(b) by 462 days.

(21) Appl. No.: 18/120,677

(22) Filed: Mar. 13, 2023

(65) Prior Publication Data

US 2024/0312773 A1 Sep. 19, 2024

(51) Int. Cl.
*H01J 49/38* (2006.01)

(52) U.S. Cl.
CPC .................................... *H01J 49/38* (2013.01)

(58) Field of Classification Search
USPC .......................................................... 250/290
See application file for complete search history.

(56) References Cited

U.S. PATENT DOCUMENTS

2009/0218485 A1* 9/2009 Kaiser ...................... H01J 49/38 250/283
2014/0061458 A1* 3/2014 Baykut ............... H01J 49/0031 250/282

* cited by examiner

*Primary Examiner* — Kiet T Nguyen
(74) *Attorney, Agent, or Firm* — Kevin H. Hazen; Hazen Patent Group, LLC

(57) ABSTRACT

The invention comprises a method for separating ions, comprising the steps of: providing an ion cyclotron resonance separator with a longitudinal axis; applying a magnetic field gradient along a length of the longitudinal axis; passing a single fixed radio frequency radially across the longitudinal axis; and spatially separating the ions at mass-to-charge ratio resonance locations along a length of the longitudinal axis, where the magnetic field gradient is within a range of 0 to 0.65 Tesla, where the single fixed radio frequency is maintained in a range of 40 kHz to 20 MHZ, and where the step of spatially separating further comprises the step of spiraling radially outward at a first resonance location a first set of ions, of the ions, the first set of ions comprising a first range of mass-to-charge ratios, the first resonance location comprising a first mass-to-charge ratio resonant with the applied radio frequency.

18 Claims, 8 Drawing Sheets

ION CYCLOTRON RESONANCE SEPARATOR APPARATUS AND METHOD OF USE THEREOF

BACKGROUND OF THE INVENTION

Field of the Invention

The invention relates generally to separation of ions, such as rare earth ions.

Discussion of the Prior Art

Separation of matter by mass is desirable for a variety of applications.

Problem

There exists in the art a need for a more efficient process for separating atomic ions by mass and/or by charge, such as rare earth ions.

SUMMARY OF THE INVENTION

The invention comprises an ion cyclotron resonance separator apparatus and method of use thereof.

DESCRIPTION OF THE FIGURES

A more complete understanding of the present invention is derived by referring to the detailed description and claims when considered in connection with the Figures, wherein like reference numbers refer to similar items throughout the Figures.

Figure 1:
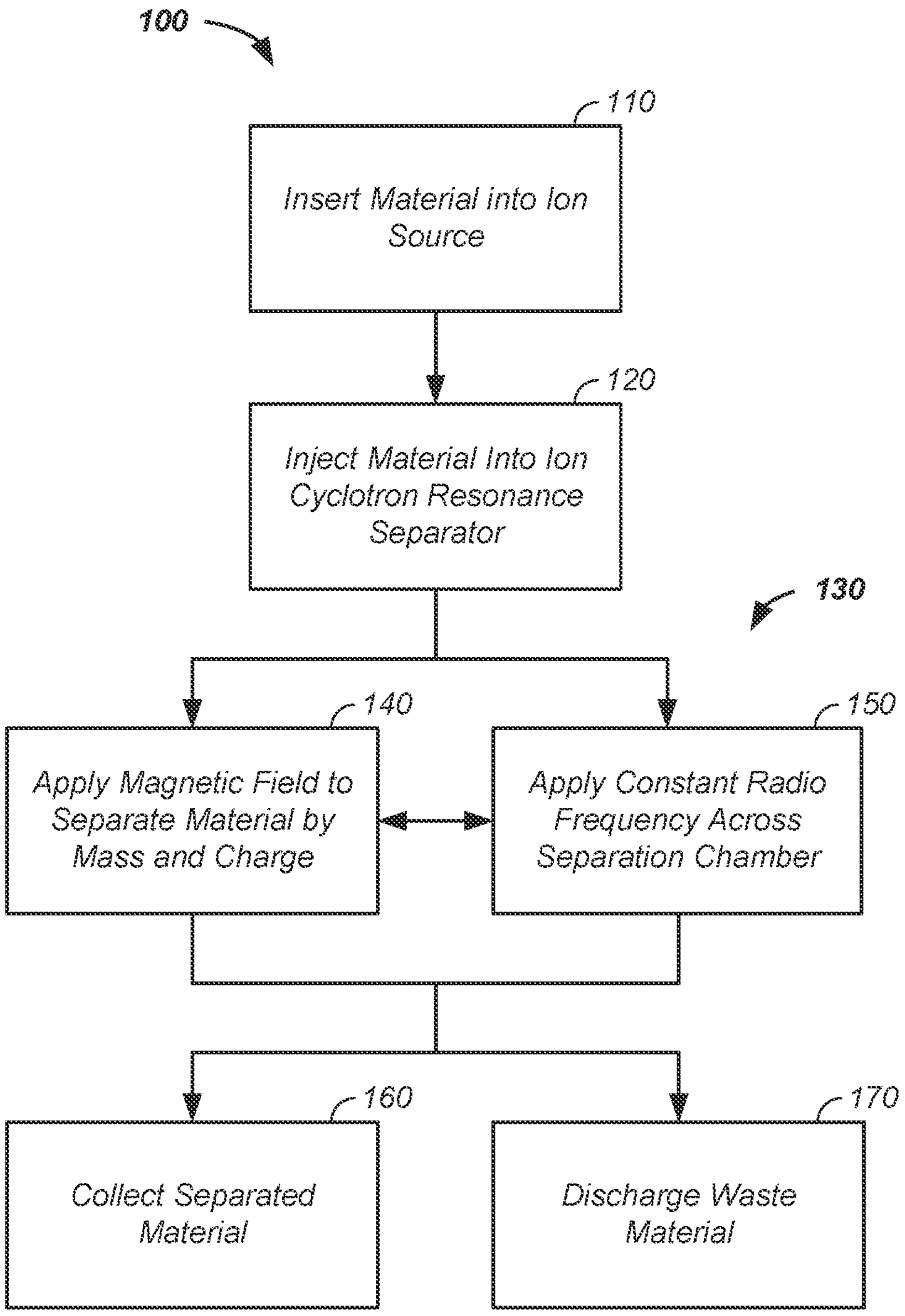
FIG. 1 illustrates an ion cyclotron resonance separator system.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a method for separating ions, comprising the steps of: providing an ion cyclotron resonance separator with a longitudinal axis; applying a magnetic field gradient along a length of the longitudinal axis; passing a single fixed radio frequency radially across the longitudinal axis; and spatially separating the ions at mass-to-charge ratio resonance locations along a length of the longitudinal axis, where the magnetic field gradient is within a range of 0 to 0.65 Tesla, where the single fixed radio frequency is maintained in a range of 40 kHz to 20 MHz, and where the step of spatially separating further comprises the step of spiraling radially outward at a first resonance location a first set of ions, of the ions, the first set of ions comprising a first range of mass-to-charge ratios, the first resonance location comprising a first mass-to-charge ratio resonant with the applied radio frequency.

Generally, an ion cyclotron resonance separator, as described herein, is used to separate ions, such as a first ion having a first mass-to-charge ratio from a second ion having a second mass-to-charge ratio. The ion could be common, such as an ion of any metal, such as iron or aluminum, and/or less common, such as an ion of a rare earth element. Optionally, ions are placed directly into the separator or the ions are formed in an injector and injected into the separator. The source material is optionally any matter, but one source is optionally fly ash, such as a discharge from a smelting plant.

Herein, a rare earth element, also referred to as a rare earth, refers to one or more of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). They are often found in minerals with Thorium (Th) and less commonly Uranium (U).

Herein, a rare earth ore contains: (1) one or more rare earth elements in any oxidized form in a naturally occurring ore material, such as a solid material, rock, and/or sediment. The ore is optionally and preferably crushed and/or powdered prior to the separation process described herein. Herein, an ore is a natural occurrence of rock or sediment that contains sufficient minerals with economically important elements, typically metals, that can be economically extracted from the deposit. Herein, a processed ore is an ore that has been prepared for extraction, such as by mechanical filtering, crushing, physical separation, and/or via a pre-chemical treatment.

Herein, a z-axis runs along a longitudinal axis of a separation chamber of the ion cyclotron resonance separator and an x/y-plane is perpendicular to the z-axis.

Ion Cyclotron Resonance Separator

Referring now to FIG. 1, an ion cyclotron resonance separator system 100 is illustrated. Generally, in a first process 110, material is inserted into an ion source, where ions are generated. In a second process 120, matter, material, and/or ions is/are injected into an ion cyclotron resonance separator from the ion source. In a third process 130, ions are separated by mass and/or by mass-to-charge ratios. In the third process 130: (1) a magnetic field and/or a magnetic field gradient is applied 140 along a length of a separation chamber, which results in rotations of the ions around a central axis of the separation chamber and (2) a constant radio frequency is applied 150 axially across the separation chamber resulting in acceleration of the ions and resonance of ions at specific charge to mass ratios. Hence, a spin of the ions, resultant from the magnetic field, and an acceleration of a velocity of the ions, resultant from the electric field, combines to create a set of cyclotron pathways resulting in differing ions, based on mass and charge, being spun radially outward from a separation chamber at differing longitudinal positions of the separator, which results in separation of the ions. Subsequently, in a fourth process, separated material is collected 160 and/or, in a fifth process, waste material is discharged 170 from the separation chamber. The ion cyclotron resonance separator system 100 is further described, infra.

Figure 2A:
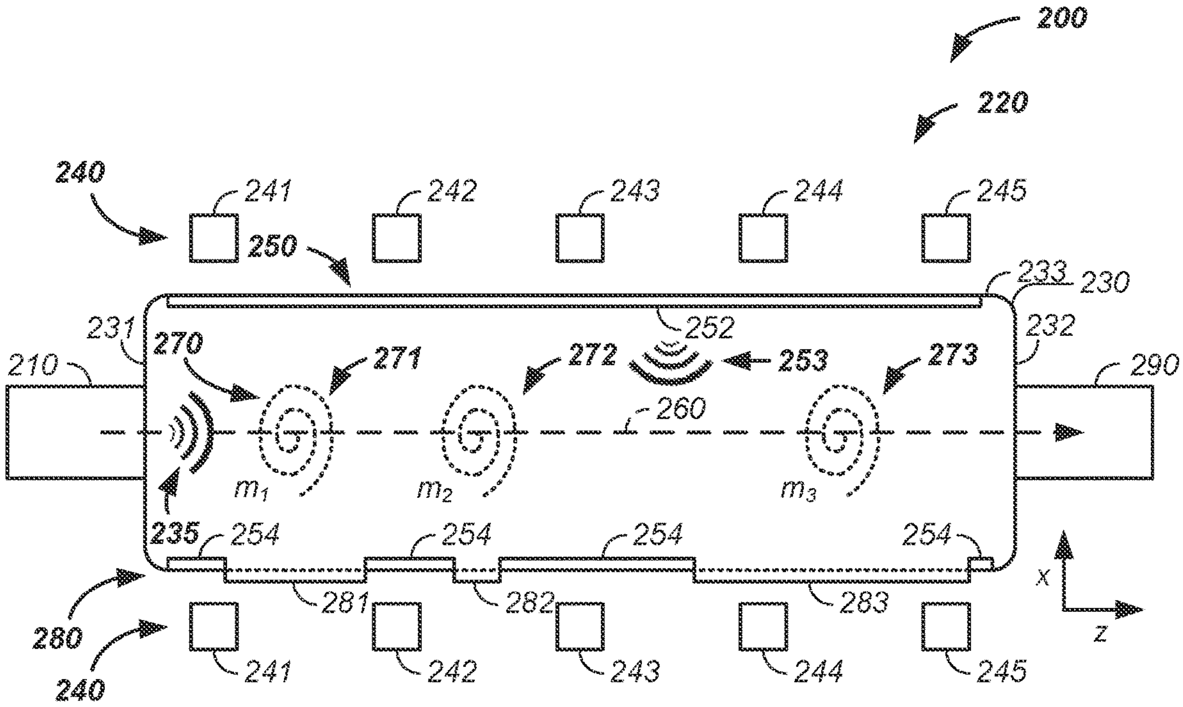
FIG. 2A, FIG. 2B, and FIG. 2C, respectively, illustrate an ion cyclotron resonance separator; a separation chamber; and a separation chamber with magnetic and electric field lines.

Referring now to FIG. 2A, an ion cyclotron resonance separator apparatus 200 is illustrated. Generally, an ion source 210 optionally generates ions and/or injects ions into an ion cyclotron resonance separation section 220. The ion cyclotron resonance separation section 220 optionally and preferably includes: a separation chamber 230, a set of magnetic field coils 240, a radio frequency system 250, a central longitudinal axis 260, a set of magnetic field resonance zones 270, and a set of collection zones 280. Waste product is optionally discharged into a waste container 290. The ion cyclotron resonance separation section 220 is further described infra.

Still referring to FIG. 2A, the ion cyclotron resonance separation section 220 includes a magnetic field 235 or magnetic field gradient along a longitudinal length, such as along the z-axis, of the separation section 230 between an entrance wall 231 and an exit wall 232. More particularly, a set of n magnetic field coils 240, where n is a positive integer such as greater than 1, 2, 3, 4, 5, 10, or 15 is used to generate the magnetic field gradient along the longitudinal length of the separation section 230. As illustrated, the magnetic field is optionally and preferably generated with a first magnetic field coil 241, a second magnetic field coil 242, a third magnetic field coil 244, and a fourth magnetic field coil 245. The non-uniform magnetic field, also referred to as the magnetic gradient, allows for cyclotron resonances for multiple ion masses at various distances along the longitudinal length of the separation chamber 230 and/or a continuum of ion masses or ion mass-to-charge ratios, with a single, same or, common electric field frequency, such as a common radio frequency (RF). Optionally and preferably, the magnetic field progresses from a higher magnetic field to a lower magnetic field along the z-axis as by injecting the material to be separated on the high magnetic field side of the separation section 230 all of the ions being separated are confined and heavier ions spin out first. At lower magnetic fields larger mass ion will have larger radii of orbit, such as a larger gyro radii, even when not resonant. However, optionally, the magnetic field progresses from a lower magnetic field to a higher magnetic field side along the longitudinal axis of the separation section 230. Two examples illustrate magnetic field coils used to generate a decreasing magnetic field along the length of the separation section 230.

Example I

Figure 2B:
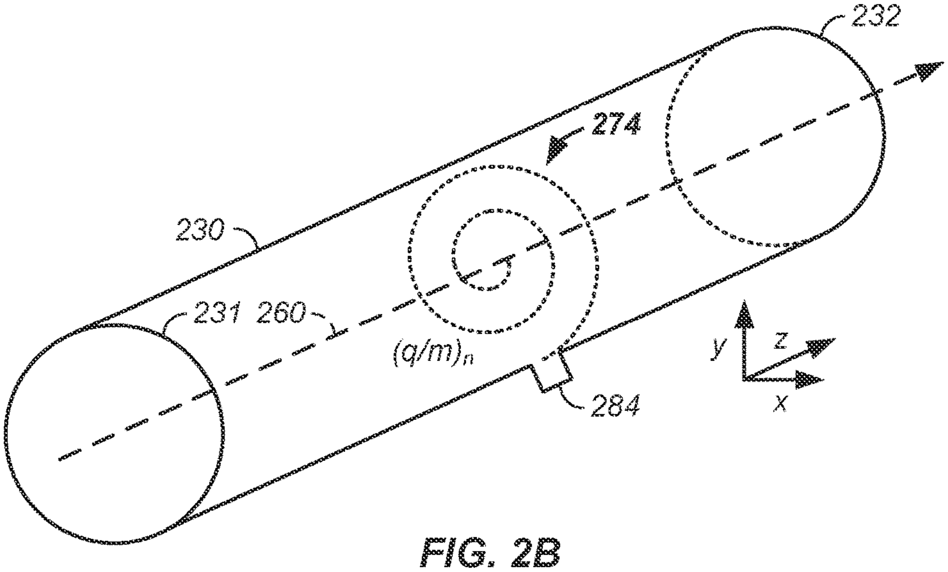
Figure 2C:
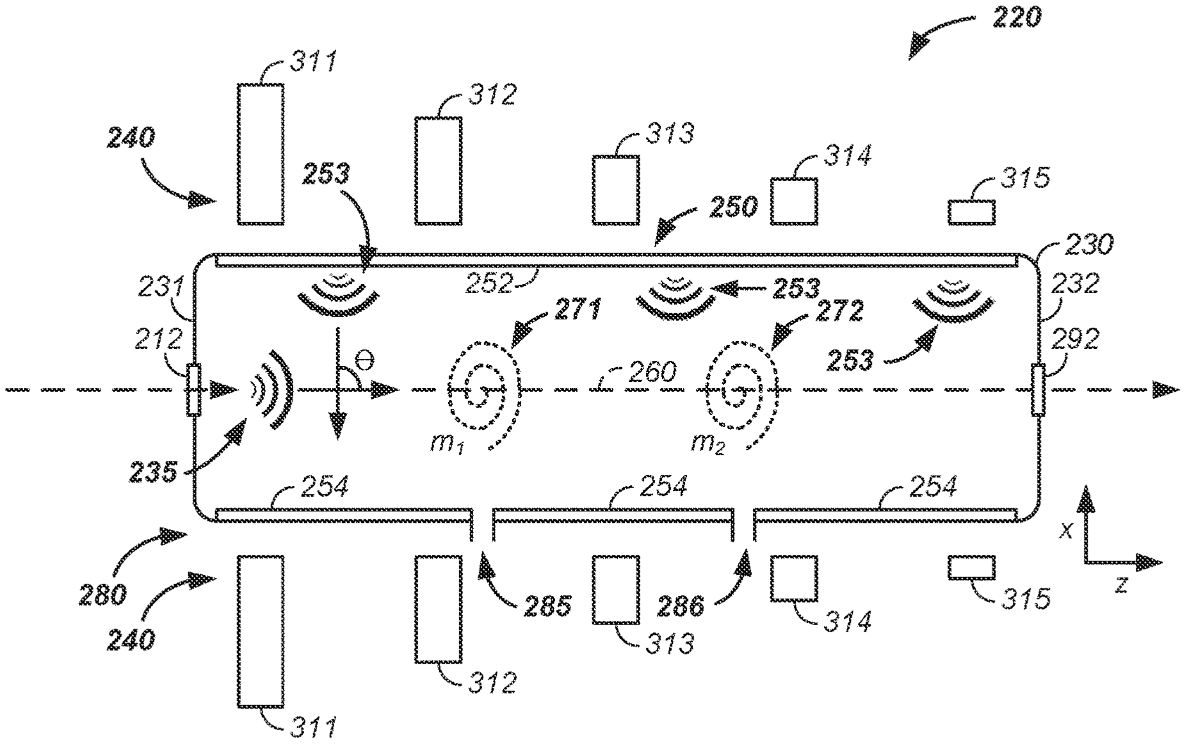
Figure 3:
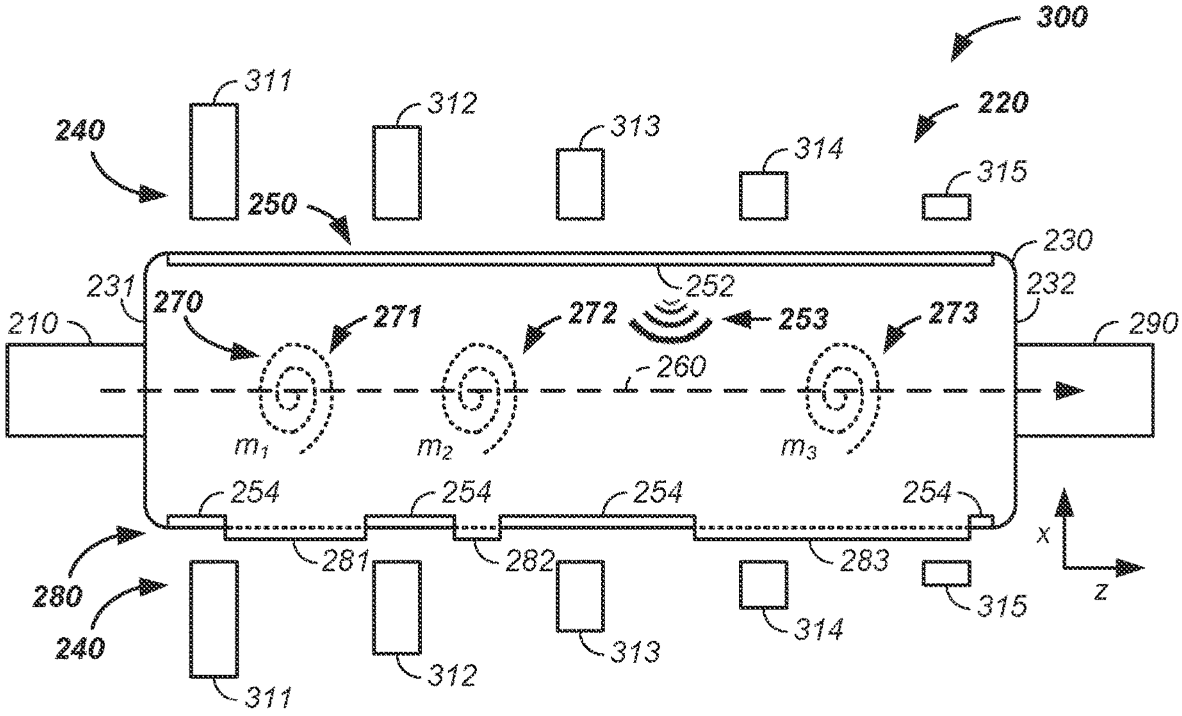
FIG. 3 illustrates a separation chamber with decreasing magnetic field generating coils along a longitudinal separation axis.

Referring now to FIG. 2C, the decreasing magnetic field gradient along the longitudinal length of the separation section 230 is optionally achieved by decreasing the cross-sectional area of the coils as a function of distance along the separation section 230. As illustrated, a first winding 311, a second winding 312, a third winding 313, a fourth winding 314, and a fifth winding 315, such as individual coils, have progressively smaller cross-sectional areas, diameters, heights, and/or widths to yield a diminishing magnetic field gradient along the length of the separation section 230. For instance, an $n^{th}$ coil, such as the first coil, has a first cross-sectional area and an $n^{th}+1$ coil, such as the second coil, has a second cross-sectional area that is at least 1, 2, 3, 5, 10, or 20 percent smaller than the first cross-sectional area.

Example II

Figure 4:
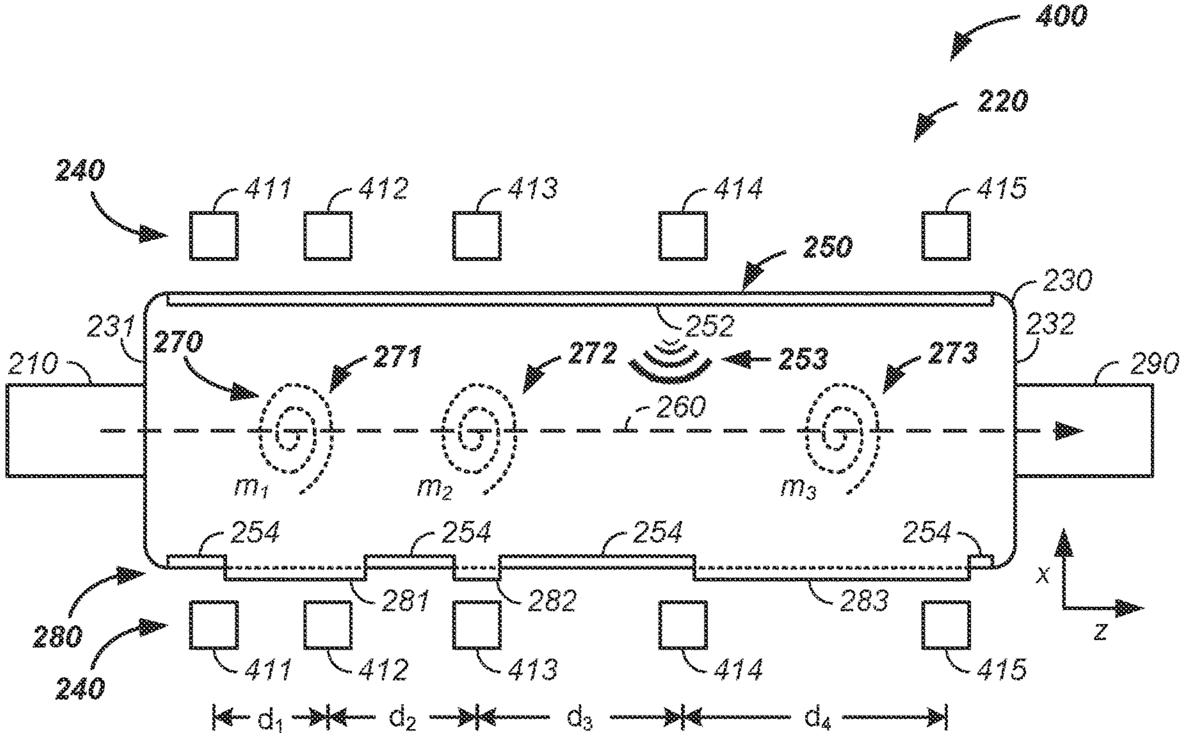
FIG. 4 illustrates a separation chamber with increasing distance between magnetic field generating coils along a longitudinal separation axis.

Referring now to FIG. 4, the decreasing magnetic field gradient along the longitudinal length of the separation section 230 is optionally achieved by increasing spacing between subsequent members of the set of n magnetic field coils 240. For instance, as illustrated, a first coil 411, a second coil 412, a third coil 413, a fourth coil 414, and a fifth coil 315, such as in individual windings, have progressively increasing distances between the respective coils along the length of the separation chamber 230. For instance, there is a first distance, $d_1$, between the first coil 411 and the second coil 412; a second distance, $d_2$, between the first coil 412 and the second coil 413; a third distance, $d_3$, between the first coil 413 and the second coil 414; a fourth distance, $d_4$, between the first coil 414 and the second coil 415. For example, $d_2$ is at least 1, 5, or 10 percent greater than $d_1$; $d_3$ is at least 1, 5, or 10 percent greater than $d_2$; and/or $d_4$ is at least 1, 5, or 10 percent greater than $d_3$.

Referring again FIG. 2A, the ions to be separated also pass through an electric field system 250. The electric field is provided by a radio frequency RF antenna or launching structure, horn or coupling loop. The electric field is substantially to entirely perpendicular to the magnetic field. The electric field system 250 includes one or more first electrodes 252 on a first side of the separation chamber 230 and one or more second electrodes 254 on a second side of the separation chamber opposite the first side. A first electrode 252/second electrode 254 pair are referred to as any of: a positive electrode and a negative electrode; an electrode and a biased electrode; a bias electrode and a ground electrode; and/or simply a ground and a bias. The positive electrode and the negative electrode switch polarities as a function of time. Optionally and preferably, the polarity switch is at 2 MHZ, 13 MHz, or 13.56 MHz. However, the polarity switch is optionally anywhere in a range of 40 KHz to 20 MHz. The generated electric field 253 is optionally and preferably perpendicular to the magnetic field. However, referring now to FIG. 2C, the electric field and magnetic fields optionally form an angle theta, θ, where theta is within 1, 2, 4, 6, 8, 10, 15, or 20 degrees of 90 degrees.

Referring again to FIG. 2A and referring now to FIG. 2B, separation of the ions occurs through interaction of the ions with the magnetic field 235 and the RF field 253. Basically, in a magnetic field a charged particle will move in a circular orbit around a magnetic field line as governed by the Lorentz force, equation 1, $$F=q(E+v\times B) \quad \text{(eq. 1)}$$

where F is the force on the ion, q is the charge of the ion, E is the electric field, v is the velocity of the ion, and B is the magnetic field. Here, F, E, v, and B are all vector quantities with both a magnitude and direction, such as at a first point B=0.1 T in the z-direction and at a second point B=0.15 T in the z-direction. Here x is denoting a vector cross product, such as the cross product of v and B is written "v×B", and the resultant is a third vector with magnitude v times B, in the direction perpendicular to both v and B. So, as the ions, which each have a mass-to-charge ratio, travel through the separation chamber, the ions rotate around the center line 260 in the magnetic field 235 based on the Lorenz force at a Larmor frequency. In addition, the ions are accelerated by the electric field 253, which causes the ions to accelerate progressively radially outward toward an outer wall 233 of the separation chamber 230.

Still referring to FIG. 2A and FIG. 2B, separation of the ions with varying charge-to-mass ratios results from the individual interactions of the various ions with the magnetic field 235 and the electric field 253. As described, supra, the frequency of rotation of the ions to be separated is based upon the mass and charge of each ion. As illustrated, a mass-to-charge ratio of a first ion with a first mass, $m_1$, and/or a first charge-to-mass ratio, $q/m_1$, rotates around the center line 260 at a first position. The velocity of the ion is based upon the electric field 253. Thus, when the magnetic field results in rotation of the first ion about the magnetic field, such as at the first mass-to-charge ratio, and the electric field causes the first ion to accelerate, such as in resonance, the result is in an outwardly increasing radius of rotation of the first ion in a first spiral path 271 or cyclotron path that eventually hits the outer wall 233 of the separation chamber 230 at/within a first collection zone 281. Similarly, when the magnetic field results in rotation of a second ion with a second mass, $m_2$, about the magnetic field, such as at a second mass-to-charge ratio, and the electric field causes the second ion to accelerate, the result is in an outwardly increasing radius of rotation in a second spiral path 272 or cyclotronic path that eventually hits the outer wall 233 of the separation chamber 230 at/within a second collection zone 282. As illustrated, a third ion with a third mass, $m_3$, or third mass-to-charge ratio is spun outward in a third path 273 into a third collection zone 283. FIG. 2B illustrates a generic ion with a generic charge to mass ratio (q/m) n outwardly spiraling, as a result of the local magnetic field 235 and electric field 253, in a fourth path 274 to a fourth collection zone 284. Thus, each collection zone collects ions of separate charge-to-mass ratios. As further described, supra, a given collection zone is optionally used to collect ions with a range of charge-to-mass ratios.

Still referring to FIG. 2A, collection zones 280, where the outward spiraling ions strike the outer wall 233 of the separation chamber 230, are provided. For instance, as illustrated, a first mass, $m_1$, of the first ion has a first outer spiral 271 into a first collection location 281; a second mass, $m_2$, of a second ion has a second outer spiral 272 into a second collection location 282; and a third mass, $m_3$, of a third ion has a third outer spiral 273 into a third collection location 283. Thus, the combination of: (1) the magnetic field 235, such as in a gradient, and (2) the electric field 253, such as constant RF field, results in separation of the ions into differing collection zones, based on mass of the ions and/or the mass-to-charge ratio of the ions.

Referring now to FIG. 2C, the collection zones 280 are illustrated as optional collection ports, such as a fifth collection port 285 and a sixth collection port 286, which correspond, based on the common first and second masses, with the first collection zone 281 and the second collection zone 282.

Still referring to FIG. 2C, the separations chamber 230 is illustrated with an optional entrance port 212 and an optional exit port 292. For instance, the entrance port 212 is used to control any of timing of injection of the ions and/or the unseparated mass into the injection chamber and/or is used to extract from an injection port ions into the separation chamber 230, such as by control of an electric field.

Figure 5:
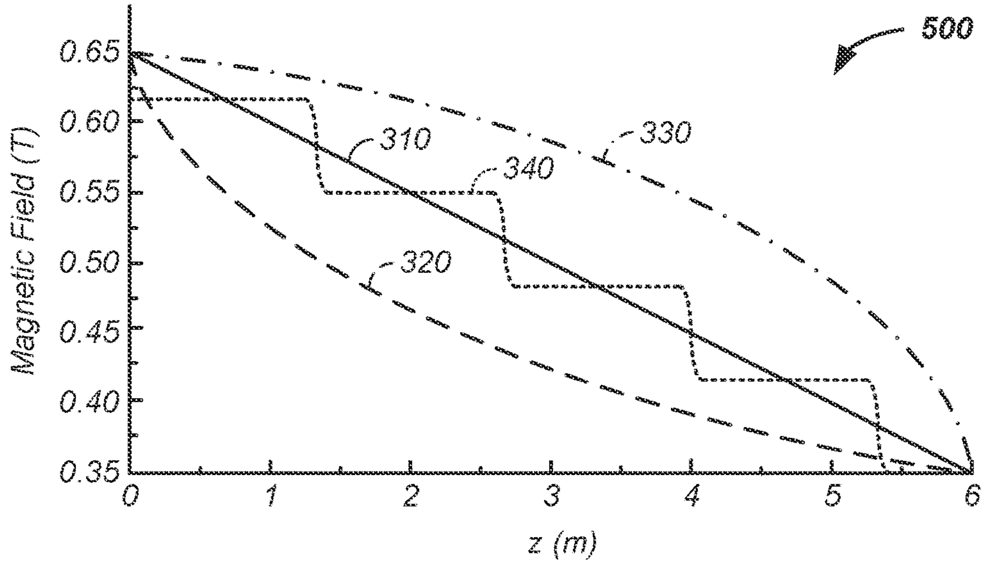
FIG. 5 illustrates various magnetic field profiles along a mass/longitudinal separation axis.

Referring now to FIG. 5, the magnetic field 235 in the separation chamber 230 is further described. Four examples of profiles of the magnetic field 235 are illustrated in FIG. 5. However, the magnetic field profile 500 is optionally of any shape, such as combining any element of the four illustrated profiles. In a first optional magnetic field profile 310, the magnetic field 235 decreases along the longitudinal axis, z-axis, of the separation chamber 230, such as from the entrance wall 231 to the exit wall 232. Here, the longitudinal length of the separation chamber is optionally as illustrated with a length of six meters. Optionally, the length of the separation chamber is greater than 0.1, 0.2, or 0.5 meters and less than 1, 2, 5, 10, 25, or 50 meters. As illustrated, the magnetic field in the first magnetic field profile 310 decreases from 0.65 T to 0.35 T; however the magnetic field is optionally greater than 0.1, 0.2, or 0.3 T and/or is less than 5, 3, 2, 1, or 0.8 T. In a second optional magnetic field profile 320, the magnetic field 235 decreases non-linearly along the longitudinal axis, z-axis, of the separation chamber 230, such as from the entrance wall 231 to the exit wall 232. In a third optional magnetic field profile 330, a rate of decrease of the magnetic field 235 increases as a function of distance from the entrance wall 231. In a fourth optional magnetic field profile 340, regions of the magnetic field as a function of distance from the entrance wall are constant or within 1, 2, 5, or 10 percent of constant, allowing a wider separation zone, and other regions drop off dramatically, such as at a rate exceeding 0.1 T/0.1 meter, allowing closer positioning of separation zones to reduce the overall size of the separation chamber 230. Generally, regions of steeper magnetic field place resonance locations closer together and regions of less steep field space out the locations of resonances. These field perturbations might be caused by other magnetic field coils, such as smaller trim coils and/or corrections coils, distinct from the main field coils. Magnetic field fluctuations are optionally used to account for different isotopic abundances and/or temperature effects, as further described supra.

Figure 6:
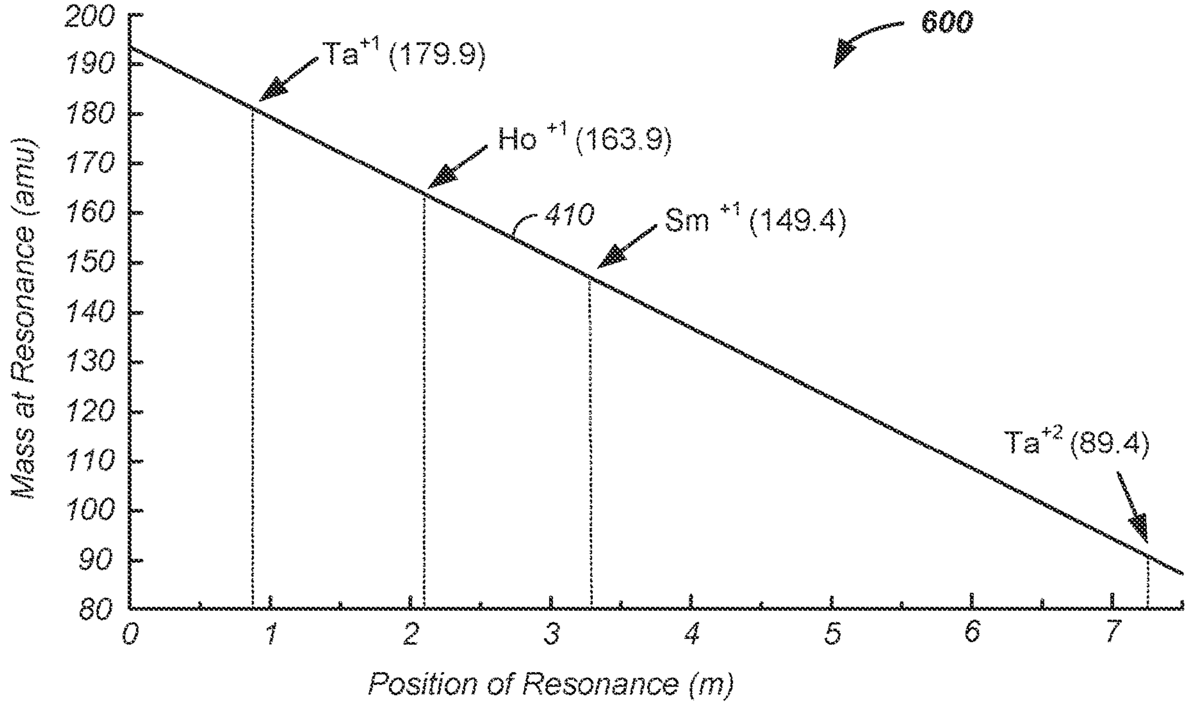
FIG. 6 illustrates separation of ionic masses and mass to charge ratios.

Referring now to FIG. 6, an example of separation of ions 600 with the ion cyclotron resonance separator system 100 is provided. In this example, ions of tantalum, $Ta^{+1}$, holmium, $Ho^{+1}$, and samarium, $Sm^{+1}$, are separated. Each of these cations has a plus one charge, so separation is reduced to being by mass. In this example, $Ta^{+1}$, $Ho^{+1}$, and $Sm^{+1}$, with respective masses of 179.9, 163.9 and 149.4 atomic mass units (u) are collected at approximately 0.9, 2, 1, and 3.3 meters; the important aspect being the ions are separable based on mass as a function of distance in the separation chamber 230 into individual collection zones. Notably, $Ta^{+1}$ and $Ta^{+2}$ are also separated at resonance positions of approximately 0.9 and 7.2 meters based on a difference in charge, which affects the mass-to-charge ratio.

Optionally, any ion, such as cations and/or anions are separable with the ion cyclotron resonance separator system 100.

Figure 7A:
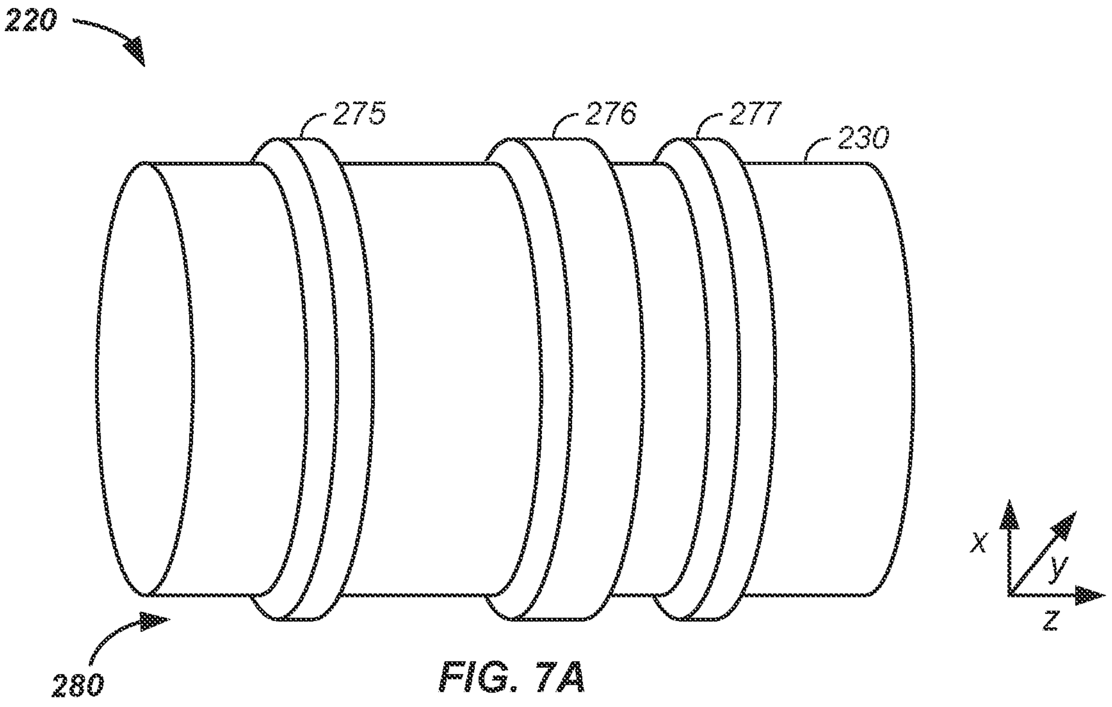
FIG. 7A illustrates an ion collection chamber and FIG. 7B illustrates a collection ring of the ion collection chamber.

Referring now to FIG. 7A, the set of collection zones 280 are further described. Here, an example of the first collection zone 281 uses a first collection ring 275 to collect ions with a first charge-to-mass ratio and/or a first range of charge-to-mass ratios. Similarly, an example of the second collection zone 282 uses a second collection ring 276 to collect ions with a second charge-to-mass ratio and an example of the third collection zone 283 uses a third collection ring 277 to collect ions with a third charge-to-mass ratio. The collections rings are optionally slid into position at any point along the separation chamber 230. The widths of the collection rings are optionally of different size to collect a range of cation masses, such as a range of isotopes as further described infra.

Figure 7B:
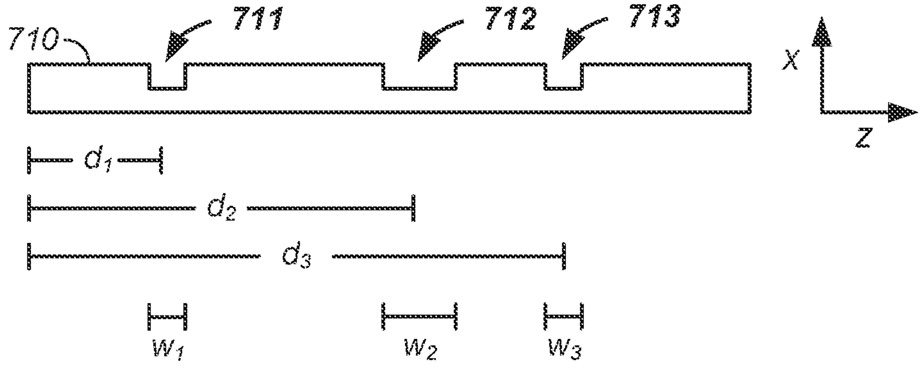

Referring still to FIG. 7A and referring now to FIG. 7B, the set of collection zones 280 are further described. As illustrated in FIG. 7B, the set of collection zones 280 are collected with a collection ring 710 that optionally and preferable slides around the separation chamber 230 into a collection position. More particularly, the collection ring 710 is optionally a cylinder that slides over the separation chamber 230, where the collection ring 710 has a set of collection trenches/collection chambers corresponding to the set of collection zones. As illustrated, the collection ring 710 has a set of collection trenches, such as a first collection trench 711 corresponding to an example of the first collection zone 281; a second collection trench 712 corresponding to an example of the second collection zone 282; and a third collection trench 713 corresponding to an example of the third collection zone 283. More particularly, the collection ring 710 has n collection trenches, where n is a positive integer greater than 0, 1, 2, 3, 5, or 10. The n collection trenches are set at n distances along the longitudinal length of the separation chamber 230. A first distance, $d_1$, a second distance, $d_2$; and a third distance, $d_3$, exemplify the set of n distances along the longitudinal length of the separation chamber 230. The widths of the n collection trenches, such as a first trench width, $w_1$; a second trench width, $w_2$; and a third trench width, $w_3$, are optionally different to allow each collection zone to collect a range of mass-to-charge ratios, as further described infra.

Temperature

Figure 8:
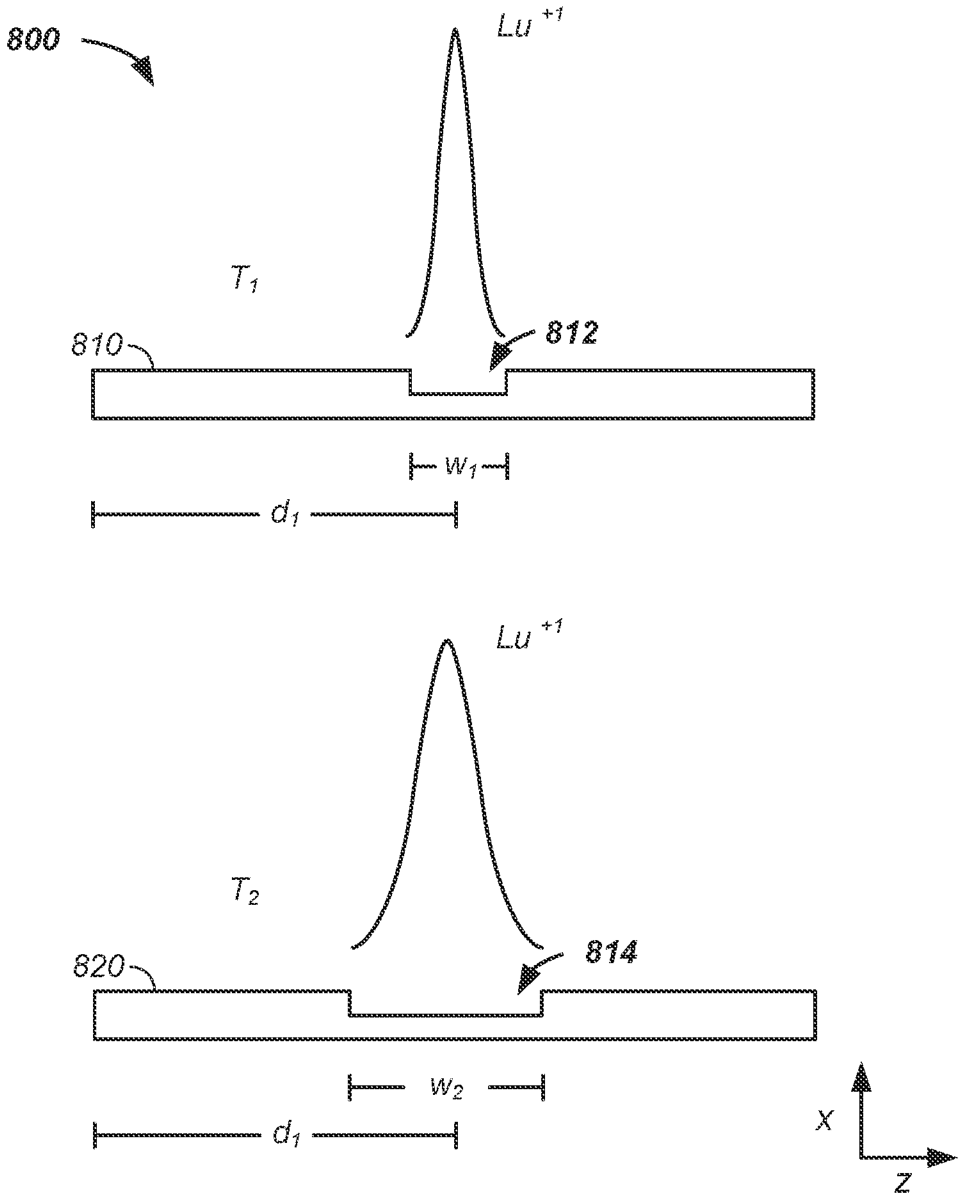
FIG. 8 illustrates temperature dependent ion collection chambers.

Referring now to FIG. 8, a first collection ring 810 and a second collection ring 820 are illustrated, where the first collection ring 810 and the second collection ring 820 have a fourth collection trench 812 and a fifth collection trench 814 at a common distance, $d_1$; however, the fourth collection trench 812 and the fifth collection trench 814 have differing widths, a first collection width, $w_1$, and a second collection width, $w_2$, respectively. The first collection width, $w_1$, is optionally and preferably used at a first operation temperature, $T_1$, of the separation chamber 230 and the second collection width, $w_2$, is optionally and preferably used at a second operation temperature, $T_2$, of the separation chamber 230, such as where the second operation temperature is at least 10, 20, 50, 100, 200, and/or 500 degrees greater than the first collection temperature in degrees Kelvin.

Isotopes/Range of Masses

Figure 9:
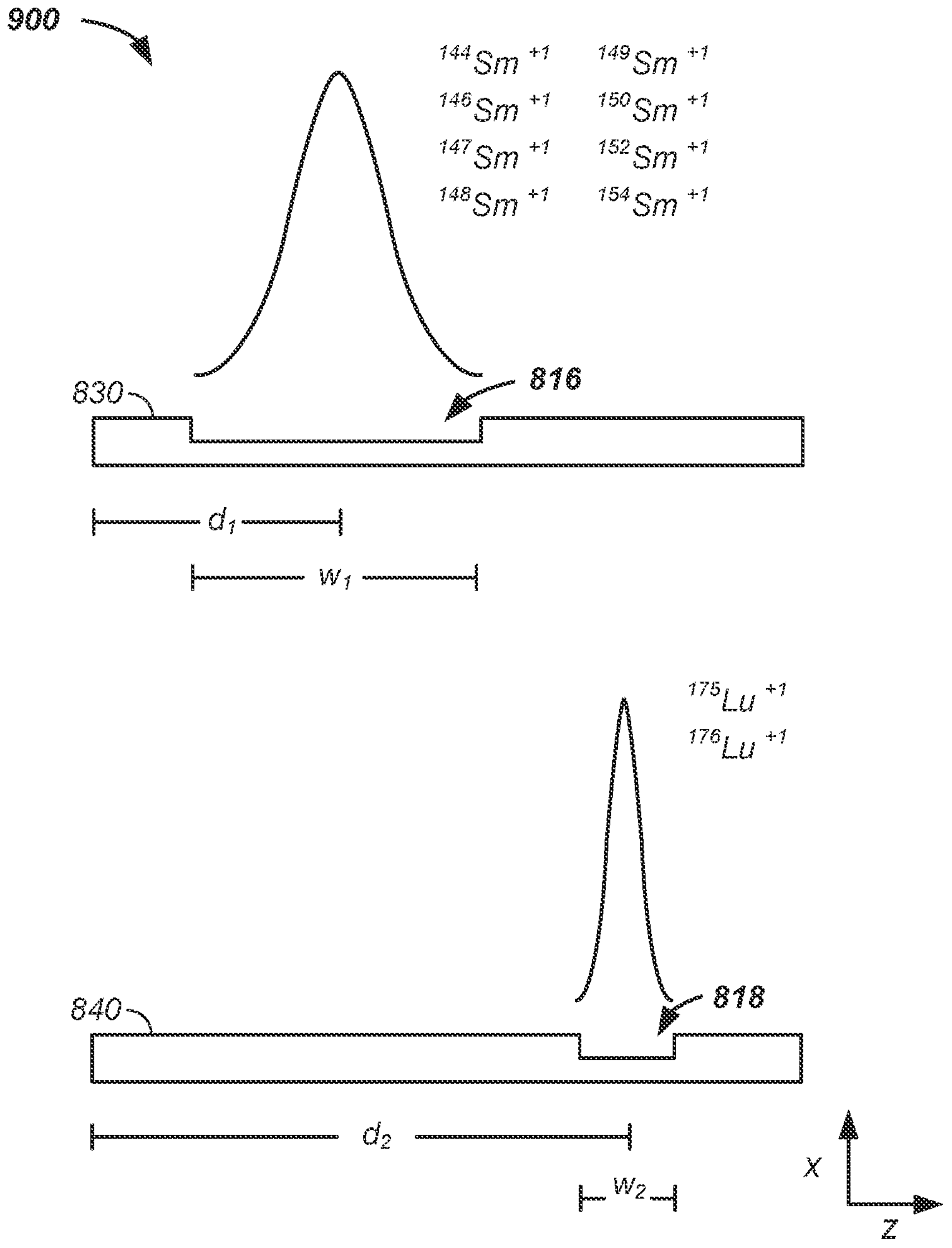
FIG. 9 illustrates isotope mass spread dependent collection chambers.

Referring now to FIG. 9, widths of members of the set of collection zones 280 are further described. Many elements have a number of isotopes. Isotopes vary in mass by differing in a number of neutrons. For example, samarium has eight common isotopes and the cation, $Sm^{+1}$, has a range of masses ranging from 144 to 154 atomic mass units. Particularly, common isotopes of samarium in the cation $Sm^{+1}$ are in the form of $^{144}Sm^{+1}$, $^{146}Sm^{+1}$, $^{147}Sm^{+1}$, $^{148}Sm^{+1}$, $^{149}Sm^{+1}$, $^{150}Sm^{+1}$, $^{142}Sm^{+1}$, and $^{154}Sm^{+1}$. Thus, the samarium cation has a range of 10 atomic mass units. However, lutetium has only two common isotopes with a range of 2 atomic mass units; common cations of lutetium isotopes are $^{175}Lu^{+1}$ and $^{176}Lu^{+1}$. Thus, optionally and preferably, a third collection ring 830 and a fourth collection ring 840 are used for differing range of isotope masses. As illustrated, the third collection ring 830 has a sixth collection trench 816 with a first width corresponding to a range of ten atomic mass units, such as for Sm, or slightly larger, such as widths corresponding to collection zones 1, 2, or 3 atomic mass units larger to ease alignment and/or temperature specifications. Similarly, the fourth collection ring 840 has a sixth collection trench 816 with a second width corresponding to a range of two atomic mass units, such as for Lu, or slightly larger, such as widths corresponding to collection zones 1, 2, or 3 atomic mass units larger to ease alignment and/or temperature specifications. For example, a second collection zone is optionally at least 1, 2, 5, 10, 20, 50, 100, 200, or 500 percent wider than a first collection zone. Generally, each collection zone, opening in the separation chamber 230, and/or collection trench has a distance and a width corresponding to the desired range of masses to be collected.

Still yet another embodiment includes any combination and/or permutation of any of the elements described herein.

The main controller/controller/system controller, a localized communication apparatus, and/or a system for communication of information optionally comprises one or more subsystems stored on a client. The client is a computing platform configured to act as a client device or other computing device, such as a computer, personal computer, a digital media device, and/or a personal digital assistant. The client comprises a processor that is optionally coupled to one or more internal or external input device, such as a mouse, a keyboard, a display device, a voice recognition system, a motion recognition system, or the like. The processor is also communicatively coupled to an output device, such as a display screen or data link to display or send data and/or processed information, respectively. In one embodiment, the communication apparatus is the processor. In another embodiment, the communication apparatus is a set of instructions stored in memory that is carried out by the processor.

The client includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C#, Visual Basic® (Microsoft, Redmond, WA), Matlab® (MathWorks, Natick, MA), Java® (Oracle Corporation, Redwood City, CA), and JavaScript® (Oracle Corporation, Redwood City, CA).

The main controller/controller/system controller comprises computer implemented code to control one or more sub-systems. The computer implemented code is programmed in any language by one skilled in the art of the subsystem and/or by a skilled computer programmer appropriate to the task. Herein, for clarity of presentation and without loss of generality, specific computer code is not presented, whereas computer code appropriate to the task is readily available commercially and/or is readily coded by a computer programmer with skills appropriate to the task when provided the invention as described herein.

Herein, any number, such as 1, 2, 3, 4, 5, is optionally more than the number, less than the number, or within 1, 2, 5, 10, 20, or 50 percent of the number.

Herein, an element and/or object is optionally manually and/or mechanically moved, such as along a guiding element, with a motor, and/or under control of the main controller.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for separating ions, comprising the steps of:
- providing an ion cyclotron resonance separator with a longitudinal axis;
- applying a magnetic field gradient along a length of said longitudinal axis;
- passing a single fixed radio frequency radially across said longitudinal axis; and
- spatially separating the ions at mass-to-charge ratio resonance locations along a length of said longitudinal axis.

2. The method of claim 1, said magnetic field gradient within a range of 0 to 0.65 Tesla.

3. The method of claim 2, said single fixed radio frequency maintained within one percent of one of:
- 2 MHZ;
- 13 MHz; and
- 13.56 MHz.

4. The method of claim 2, said single fixed radio frequency maintained in a range of 40 kHz to 20 MHz.

5. The method of claim 4, said step of spatially separating further comprising the step of:
- spiraling radially outward at a first resonance location a first set of ions, of the ions, the first set of ions comprising a first range of mass-to-charge ratios, said first resonance location comprising a first mass-to-charge ratio resonant with the applied radio frequency.

6. The method of claim 5, further comprising the step of:
- collecting the first set of ions into a first collection container.

7. The method of claim 6, further comprising the step of:
- replaceably attaching said first collection container to a radially outward edge of a separation chamber of said ion cyclotron resonance separator.

8. The method of claim 6, said step of spatially separating further comprising the step of:
- spiraling radially outward at a second resonance location a second set of ions, of the ions, the second set of ions comprising a second range of mass-to-charge ratios, said second resonance location comprising a second mass-to-charge ratio resonant with the applied radio frequency, said first resonance location separated from said second resonance location by greater than 0.5 meter.

9. The method of claim 8, further comprising the step of:
- collecting the second set of ions into a second collection container separate from said first collection container.

10. The method of claim 9, said second collection container comprising at least one of a cup and a ring, said second collection container slidingly affixed to a separation chamber of said ion cyclotron resonance separator.

11. The method of claim 4, said step of spatially separating further comprising the step of:
- spiraling radially outward a first mass-to-charge ratio of the ions at a first resonance location, said first resonance location comprising a first mass-to-charge ratio resonant with the applied radio frequency.

12. The method of claim 11, said step of spatially separating further comprising the step of:
- spiraling radially outward a second mass-to-charge ratio of the ions at a second resonance location, said second resonance location comprising a second mass-to-charge ratio resonant with the applied radio frequency, wherein a first mass, of said first mass-to-charge ratio, is at least twenty atomic mass units greater than a second mass of said second mass-to-charge ratio.

13. The method of claim 4, said magnetic field varying in a range of 0.01 to 0.1 Tesla per meter.

14. The method of claim 13, said magnetic field varying both:
- between 0.01 to 0.05 T at a first position along the longitudinal axis; and between 0.05 to 0.1 T at a second position along the longitudinal axis.

15. The method of claim 13, said magnetic field varying:

between 0.01 to 0.03 T at a first position along the longitudinal axis;

between 0.03 to 0.06 T at a second position along the longitudinal axis; and between 0.06 to 0.1 T at a third position along the longitudinal axis.

16. The method of claim 1, said step of applying, further comprising the step of:

reducing the magnetic field gradient from an entrance side of a separation chamber of said ion cyclotron resonance separator to an exit side of said separation chamber.

17. The method of claim 16, said step of passing further comprising the step of:

alternating an electric field between a first axial surface and a second axial surface of said separation chamber.

18. The method of claim 16, said step of passing further comprising the step of:

alternating an electric field between opposite sides of said separation chamber across said longitudinal axis.

* * * * *